Patented Dec. 7, 1948

2,455,388

UNITED STATES PATENT OFFICE 2,455,388

PREPARATION OF 2,2-BIS (P-CHLORO-PHENYL) 1,1,1-TRICHLOROETHANE

Adrian C. Smith, Philadelphia, and Julian L. Staubly, Drexel Hill, Pa., assignors to The Pennsylvania Salt Manufacturing Company, Philadelphia, Pa., a corporation of Pennsylvania No Drawing. Application July 14, 1944, Serial No. 545,002

8 Claims. (Cl. 260—649)

The present invention relates to the synthesis of 2,2, bis (p-chlorophenyl) 1,1,1, trichloroethane (DDT) and more particularly it relates to the preparation of this compound from trichloroacetaldehyde (chloral) and monochlorobenzene employing a condensing agent under specified conditions to effect the reaction.

DDT, first prepared many years ago, Zeidler, Ber. 7, 1180-1, 1874, has, within the past few years, become an increasingly important insecticide. It is also employed for other purposes and there is, at present, need for a more efficient method of preparation, insuring higher yields of the product free from by-products and condensing agent residues.

In the prior art method of preparation chlorobenzene and chloral were condensed employing sulfuric acid as the condensing agent. Four or five volumes of concentrated sulfuric acid were mixed a long time with active agitation occasionally warming in a water bath. When a white, putty-like mass no longer separated, the whole reaction mass was washed with water and recrystallized from hot ether-alcohol.

U. S. Patent 2,329,074 discloses the following preparation: "By treating, while strongly stirring, a mixture of 2 molecules of benzene or chlorobenzene with 1 molecule of chloral or chloralhydrate with an excess of concentrated sulfuric acid (of 100% strength) heating takes place after some time, which first increases up to about 60° C. and then slowly decreases again. Stirring is continued until the reaction mass has cooled down to room temperature and contains solid particles. Then it is poured into much water whereby the raw condensation product separates out in a solid form. It is well washed out and, after being recrystallized from alcohol, it is obtained in form of white, fine crystals which show a weakly fruit odor."

The crude product obtained by the prior art method described contains, besides other impurities, sulfuric acid which is difficult to remove. Also, the sulfuric acid attacks the benzene ring, yielding objectionable sulfonated derivatives which, of course, affect the yield of DDT. There is a concomitant loss of sulfuric acid and monochlorobenzene and these losses add to the cost of the preparation.

An object of this invention is to provide a process for the preparation of DDT from chloral and monochlorobenzene in a simple and economical manner with high yields of a product of high purity and improved odor.

Another object of this invention is to provide a condensing agent which will effect the condensation of chloral and monochlorobenzene in a simple and efficient manner to form DDT avoiding, to a great extent, side-reactions and eliminating entirely the formation of sulfonated byproducts.

A further object of this invention is to provide a condensing agent which will effect the condensation of chloral and monochlorobenzene to form DDT and which can be readily and substantially completely recovered for reuse.

Other objects and advantages are apparent from this specification and the claims.

According to the invention, chloral and monochlorobenzene are condensed in reacting proportions in presence of hydrogen fluoride or hydrofluoric acid as the condensing agent.

With hydrofluoric acid as the condensing agent it is possible to obtain high yields of products of high purity and improved odor. The acid can be readily and substantially completely recovered, thus presenting important advantages over the prior art which employs sulfuric acid. It is possible to prepare a raw or primary product of a higher purity containing no appreciable acid. Also, the purification process is much simplified. This is important when the insecticide and other uses to which DDT is put are considered. For example, a product containing acid impurity, used on foliage, will destroy the leaf. It is therefore, necessary in such case to employ expensive equipment to purify the product. The product of the present invention is, as stated, substantially free from appreciable quantities of acid and consequently, does not require the expensive purification that is necessary in the case of DDT prepared employing sulfuric acid as the condensing agent.

The broad concept of this invention is that hydrofluoric acid is employed as the condensing agent. Anhydrous hydrogen fluoride is preferred but strong concentrations of hydrofluoric acid are operative, the yield of DDT increasing with increased concentrations of HF in the acid although DDT has been obtained employing 94%

HF acid. In the claims, the expression "hydrogen fluoride containing not more than about 6% water" is used to include both this highly concentrated hydrofluoric acid and anhydrous hydrogen fluoride. The quantity of hydrogen fluoride employed should be at least sufficient to insure a mol ratio $HF/CCl_3CHO$ of about 90 although a mol ratio as low as 10 is operative. Preferably, as is indicated by Table I, the mol ratio of HF to $CCl_3CHO$ will be at least about 90 and can be more, say 100 or even higher.

TABLE I

Effect of the mol ratio $HF/CCl_3CHO$

[Temperature 30° C.; reactant ratio $C_6H_5Cl/CCl_3.CHO$ 2:1 except last experiment]

| Ratio $\dfrac{HF}{CCl_3.CHO}$ | Mol Per Cent DDT (pure) | Mol Per Cent Residue (Calculated as DDT) | Mol Per Cent Conversion of chloral to crude DDT | Ratio $\dfrac{\text{pure DDT}}{\text{Residue}}$ | Mol Per Cent Yield of pure DDT (Based on chloral reacted) |
|---|---|---|---|---|---|
| 11.2 | 17.0 | 20.4 | 37.4 | 0.834 | 45.4 |
| 22.4 | 33.9 | 28.5 | 61.9 | 1.18 | 54.1 |
| 45.2 | 46.3 | 29.1 | 75.4 | 1.59 | 61.6 |
| 68.0 | 45.2 | 23.8 | 69.0 | 1.90 | 65.5 |
| ¹ 90.6 | 59.0 | (22.6) | (81.6) | (2.61) | (72.3) |

¹ Temperature 47–50°.
Reactant ratio 2½:1.
( ) Estimated values.

The condensation can be effected employing stoichiometric proportions of chlorobenzene and chloral. Table II shows the approximate effect of an increase in the chlorobenzene to chloral ratio. When the ratio is increased 100%, that is when it is 4:1, the mol% DDT is increased from 45.2% to 49.2%. The ratio of DDT to residue is increased from 1.90 to as high as 2.41. Thus, it is apparent that a definitely appreciable increase is obtainable by employing an excess of chlorobenzene although it is equally apparent that the process will yield good results when stoichiometric quantities of the reactants are employed.

TABLE II

Effect of ratio of chlorobenzene to chloral

[Temperature 30° C.; ratio $HF/CCl_3.CHO$ 68:1; duration 18 hours]

| Ratio $\dfrac{C_6H_5Cl}{CCl_3.CHO}$ | Mol Per Cent DDT (pure) | Mol Per Cent Residue (Calculated as DDT) | Mol Per Cent Conversion of chloral to crude DDT | Ratio $\dfrac{\text{pure DDT}}{\text{Residue}}$ | Mol Per Cent Yield of pure DDT (Based on chloral reacted) |
|---|---|---|---|---|---|
| 2:1 | 45.2 | 23.8 | 69.0 | 1.90 | 65.5 |
| 4:1 | 49.2 | 20.4 | 69.6 | 2.41 | 70.6 |

Agitation plays an important part in the condensation reaction. As will appear hereinafter, the condensing agent and the reactants are not miscible and to insure intimate contact agitation is necessary. The effect of agitation upon the reaction is indicated in Table III.

TABLE III

Effect of agitation

[Temperature 20–29°C.; ratio $HF/CCl_3.CHO$ 68:1; duration 18 hours]

| Agitation | Mol Per Cent DDT (pure) | Mol Per Cent Residue (Calculated as DDT) | Mol Per Cent Conversion of chloral to crude DDT | Ratio $\dfrac{\text{pure DDT}}{\text{Residue}}$ | Mol Per Cent Yield of pure DDT (Based on chloral reacted) |
|---|---|---|---|---|---|
| ¹ None | 11.3 | 26.6 | 37.9 | 0.425 | 29.8 |
| 130 | 52.5 | 21.5 | 74.0 | 2.44 | 71.0 |
| 260 | 57.2 | 22.6 | 79.8 | 2.54 | 71.6 |
| ² 130 | 55.4 | 20.8 | 76.2 | 2.66 | 72.9 |

¹ Stood 72 hours.
² Agitation at a horizontal angle of 45 degrees to the direction of stroke. See below.

Time also plays an important part in the reaction. At room temperature 45.2 mol percent of DDT was formed after 18 hours and after 64 hours 59.1 mol percent was obtained. At a higher temperature, in 1¼ and in 2½ hours, 57.2 mol percent and 64.5 mol percent DDT respectively were formed. Time and temperature are, therefore, dependent variables. The higher the temperature, the more rapid will be the overall reaction rate and vice versa. The effect of time is shown by Table IV and the effect of temperature is shown in Table V.

TABLE IV

Effect of time

[Temperature 30° C. and 75° C.; reactant ratio 2:1 and 2½:1; ratio HF/CCl₃.CHO 68:1]

| Reaction Time Hours | Mol Per Cent DDT (pure) | Mol Per Cent Residue (Calculated as DDT) | Mol Per Cent Conversion of chloral to crude DDT | Ratio $\frac{\text{pure DDT}}{\text{Residue}}$ | Mol Per Cent Yield of pure DDT (Based on chloral reacted) |
|---|---|---|---|---|---|
| 18 | 45.2 | 23.8 | 69.0 | 1.90 | 65.5 |
| 64 | 59.1 | 24.9 | 84.0 | 2.37 | 70.4 |
| 1¼ | 57.2 | 25.1 | 82.3 | 2.27 | 69.5 |
| 2½ | 64.5 | 26.6 | 90.1 | 2.42 | 71.5 |
| 3¾ | 64.5 | 28.8 | 93.3 | 2.24 | 68.5 |

TABLE V

Effect of temperature

[The closed system: Chloral-chlorobenzene-HF 68 mols of HF per mol. of CCl₃.CHO; agitation; end over end]

| Temp., °C. | Mol Per Cent DDT (pure) | Mol Per Cent Residue (Calculated as DDT) | Mol Per Cent Conversion of chloral to crude DDT | Ratio $\frac{\text{pure DDT}}{\text{Residue}}$ | Duration, Hours | Mol Per Cent Yield of pure DDT (Based on chloral reacted) |
|---|---|---|---|---|---|---|
| 96-8 | 56.3 | 34.0 | 90.3 | 1.65 | 1¼ | 62.5 |
| 75 | 64.5 | 26.6 | 90.1 | 2.42 | 2½ | 71.6 |
| 47-50 | 53.2 | 22.6 | 75.8 | 2.35 | 4½ | 70.3 |
| 30 | 45.2 | 23.8 | 69.0 | 1.90 | 18 | 65.5 |
| 23-8 | 52.5 | 21.5 | 74.0 | 2.44 | 24 | ¹ 71.0 |

¹ Agitation on shaking machine. (See below.)

While an increase in temperature will cause an increase in the overall reaction rate from 74.0% in 24 hours, at 23-8° C. to 90.3% in 1¼ hours at 96-8° C., it appears that at the higher temperatures the yield of DDT is actually lower. At room temperature the reaction rate seems to be impractically slow. A practical operating temperature now seems to be within the range of 40° C.-85° C.

In the following description of general experimental procedure it will be noted that the condensation is effected at the pressure of the reactants corresponding to the temperature employed. Thus, the condensation is effected substantially in the liquid phase. This should not be interpreted to mean that the invention does not include condensation at subatmospheric or atmospheric or even high pressures, the essence of the invention being that hydrogen fluoride or hydrofluoric acid is employed as a condensing agent for the reaction to produce DDT from chloral and monochlorobenzene.

The following experimental procedure which has been employed is set forth by way of illustration and the invention is not to be limited thereto.

Heavy copper pressure bottles were first charged with a quarter mol of chloral and 0.5 to 1.0 mol of chlorobenzene. The bottle was packed in ice and salt and the whole was balanced on a suitable scale. Gaseous HF was then introduced into the cold bottle where it liquefied and the rate of addition was followed by the gain in weight. When the required quantity of HF had been weighed in, a plug was quickly screwed into the bottle.

The charged pressure bottle was then fixed to a shaking machine or to a wheel rolling in a thermostatically controlled (±2°) water bath and there maintained during the designated time intervals at the end of which the bottle was again packed in ice thereby effectually inhibiting further reaction and making it possible to open the cylinder with relative safety. (The shaking machine used in this study had a three inch stroke and made 180 or 280 complete courses per minute. The rolling wheel used in the water bath had a 42 inch diameter and turned the bottles just inside its circumference end over end 14 times per minute.)

The bottle contents were poured into cracked ice, and if the organic layer drained completely from the reactor (indicating very incomplete reaction) it was washed several times by decantation and steamed. If practically nothing except liquid HF drained from the bottle, a good reaction had occurred as indicated by a solid mass remaining inside, and this mass was removed by solvent action. A good solvent for the purpose is methyl ethyl ketone.

The cake of organic material separated from the solvent (e. g. by mixing with water in the case of the ketone solvent) and neutralizing (e. g. by washing with a sodium carbonate solution) was rinsed with a little fresh water, transferred to a steam distillation flask and steamed. The steamed organic residue was poured into a beaker and again allowed to harden. The mass was porous and contained 5 or 10% of mechanically held moisture and at this stage it was best to break up the cake and to dry for about an hour at 50° C. Then it was weighed, transferred to a flask, and isopropanol was added. The flask was then heated in boiling water, the lumps of crude DDT were crushed to facilitate solution and after complete solution, crystallization, directly in the flask or following filtration through a loose plug of cotton, occurred on cooling. (A fixed lower temperature of 5° was attained before separating the crystallized DDT.) The mass of needles was broken up again and placed on a filter, care being taken to obtain quantitative transfer. The cake of crystalline DDT was suitably compressed and when the drainage of the isopropanol liquor practically ceased at the diminished pressure of the water pump, the solid was spread out and dried at 50° C. to absence of alcohol odor or constant weight. DDT obtained in this way usually melted not lower than 103° C.

The isopropanol filtrate was gently evaporated to constant weight and the weight of non-crystallizing residual oil was a good measure of side reactions which occurred during the synthesis.

In the foregoing tables yields and ratios have been calculated on a mol basis since conversion to other units is then readily possible. For example, 74 mols of HF to 1 mol of chloral is a weight ratio of 10 to 1 since 20×74/147.5=10. Similarly 2.2 mols of chlorobenzene to 1 mol of chloral is a weight ratio of 1.68 to 1 since 2.2×112.5/147.5= 1.68. The oil residues remaining after the removal of crystalline DDT have been calculated arbitrarily on a mol basis as though the residue were DDT. The sum of the DDT plus the residue is assumed to be the extent of total reaction. The yield of DDT actually isolated, divided by % total reaction, gives a figure for total possible DDT obtainable if reaction had gone 100% and is included in Tables I to V. Unreacted chlorobenzene, separated by steaming the primary reaction batch, is also an index of total reaction but is only approximate due to mechanical and vapor losses.

The ratio of crystallized DDT to oil residue is included since it significantly shows the relative purity of DDT obtainable under varying conditions.

In the following claims "DDT" is to be interpreted to include 2,2 bis (p-chlorophenyl) 1,1,1, trichloroethane. Also, where, in the claims, hydrogen fluoride occurs, it is to be understood that hydrofluoric acid is included.

The invention can be practised employing chloral hydrate or even chloral alcoholate in place of chloral and in the claims chloral hydrate and chloral alcoholate are included in the term "chloral."

Modifications within the skill of those versed in the art are obviously within the appended claims and are therefore not discussed here.

We claim:

1. A method of producing DDT which comprises condensing chloral with chlorobenzene in the presence of hydrogen fluoride, the quantity of hydrogen fluoride being at least 10 times as great as the quantity of chloral, on a molar basis.

2. The process according to claim 1 wherein substantially anyhdrous hydrogen fluoride is employed.

3. The process according to claim 1 wherein the temperature during said condensation is maintained within the range of about 40° C. to 85° C.

4. The process according to claim 1 wherein the quantity of HF ranges from about 10 to 100 times as great as the quantity of chloral, on a molar basis.

5. The process according to claim 1 wherein approximately stoichiometric quantities of chloral and monochlorobenzene for reaction to form DDT are employed.

6. The process according to claim 1 wherein an excess of monochlorobenzene over the stoichiometric quantity for reaction with the chloral to form DDT is employed.

7. A process for the preparation of DDT which comprises bringing together chloral, monochlorobenzene and liquid phase hydrogen fluoride containing not more than about 6% water, the quantity of HF being at least 10 times as great as the quantity of chloral, on a molar basis, agitating the mixture under conditions wherein the reactants are maintained essentially in the liquid state, to bring about condensation of the chloral and monochlorobenzene in a liquid phase reaction, and separating the DDT from the resulting reaction product.

8. A process for preparation of DDT which comprises bringing together chloral, monochlorobenzene, and substantially anhydrous liquid phase hydrogenfluoride, approximately stoichiometric quantities of chloral and monochlorobenzene for reaction to form DDT being employed and the quantity of HF ranging from about 10 to 100 times as great as the quantity of chloral, on a molar basis, agitating and warming the resultant mixture while maintaining it under conditions wherein the reactants remain essentially in the liquid state, to bring about condensation of the chloral and monochlorobenzene in a liquid phase reaction, and after condensation has been substantially completed heating the resulting reaction mixture to separate the HF from the DDT product.

ADRIAN C. SMITH.
JULIAN L. STAUBLY.

REFERENCES CITED

The following references are of record in the file of this patent:

UNITED STATES PATENTS

| Number | Name | Date |
|---|---|---|
| 1,961,397 | Schoeller et al. | June 5, 1934 |
| 2,329,074 | Muller | Sept. 7, 1943 |

OTHER REFERENCES

Simons, "Industrial and Engineering Chemistry," vol. 32, pages 178–83 (1940).